July 28, 1964     J. HUGUENIN     3,142,366
JOINT STRUCTURE FOR FRAME MEMBERS
Filed April 5, 1961
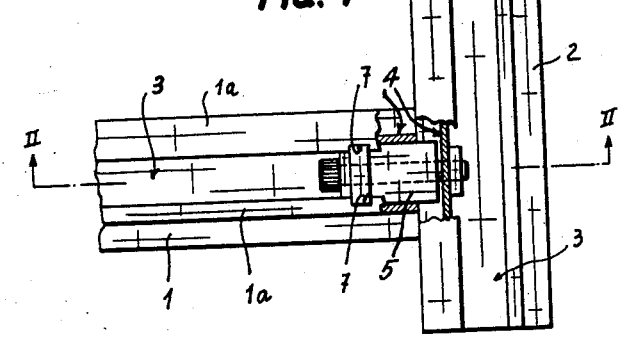
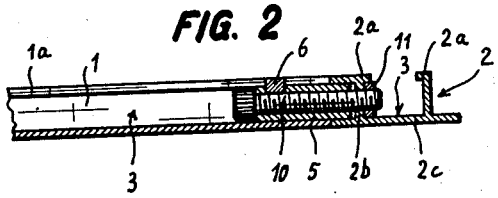
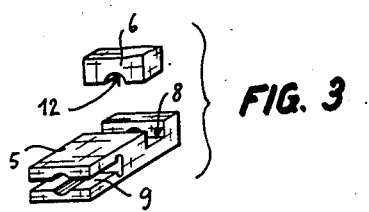
INVENTOR
JACQUES HUGUENIN
BY
                               ATTORNEY

United States Patent Office 3,142,366
Patented July 28, 1964

3,142,366
JOINT STRUCTURE FOR FRAME MEMBERS
Jacques Huguenin, 1 Rue du Midi, Le Locle, Switzerland
Filed Apr. 5, 1961, Ser. No. 100,964
Claims priority, application Switzerland Apr. 7, 1960
2 Claims. (Cl. 189—36)

The present invention relates to an assembling device for shaped members provided with longitudinal grooves, such as upright and cross members, of the framework of furniture or the like.

This assembling device is characterised by the feature that, for assembling at right angles two of the said members, a lug is partially introduced in the groove of one of the said members and is prevented from moving longitudinally by a key engaged in two recesses provided in the said member and in the said lug, this latter longitudinally receiving a screw fastening which also passes through a wall of the second member, one face of the said wall corresponding to the side of the second member on which the lug is situated, the screw fastening bearing against the other face of the said wall, and an extremity of the lug, projecting beyond the said first member, being engaged in the groove of the said second member.

The drawing shows, by way of example, one embodiment of the invention.

FIGURE 1 is an elevational view, with partial section, of the assembling device used for the assembling at right angles of two shaped members.

FIGURE 2 is a sectional view along the line II—II of FIGURE 1, and,

FIGURE 3 is a perspective view of a detail.

The device shown is adapted for assembling two members, i.e. a cross member 1 and an upright 2, both made of aluminium and of the same sectional shape, forming part of the framework of furniture or the like. Each member is provided with a longitudinal main groove 3 and with a longitudinal auxiliary groove 4. A lug 5 is partially engaged in the main groove 3 of member 1. It is prevented from moving longitudinally in the said groove by a key 6 located in two recesses 7 provided in the wings 1a of the member 1 and in a recess 8 provided in the lug 5.

The extremity of this lug, which projects beyond the member 1, is engaged in the groove 4 of the member 2, This extremity is split at 9, so that a friction occurs, due to the elasticity of this split extremity, between the lug 5 and the member 2. The lug longitudinally receives a screw 10 passing, on the other hand, through a wall 2b of the member 2 one face of which is situated toward the lug. This screw 10 is screwed in a nut 11 bearing against the other face of the wall 2b. The nut 11 is rectangular so as to engage itself between the wings 2a of the member 2 and the main wall 2c of this member, and thus be prevented from rotating.

It is to be noted that the key 6 is provided with a recess 12 allowing the passage of the screw 10.

What I claim is:

1. In a device for assembling a first member, having portions forming a first longitudinal groove and recesses laterally on opposite sides of the groove, with a second member, having opposed flanges and a wall interconnecting the flanges, forming a second longitudinal groove, there being an opening through the wall of the second member, the combination which includes a lug having a longitudinal opening and a portion adapted to engage the first of the members in the first longitudinal groove and defining a recess for said recess to be aligned with the recesses in the first member, and extremity of said lug projecting beyond the first member when said recess in said lug is aligned with the recesses in the first member, said extremity entering the second groove of the second of the members and being split longitudinally for engaging elastically the flanges of the second member, a key engaging the first member in the recesses provided in the first member and said lug in said recess in the lug for preventing said lug from moving longitudinally, and a fastening extending through said lug opening and the opening in the wall of the second member and having interengaging threaded fastening portions respectively bearing on said lug and the second member for securing said lug to the second member while said longitudinally split extremity is in the second groove of the second member and elastically engages the flanges of the second member.

2. In a device according to claim 1, wherein said combination is characterized by having the axis of said longitudinal opening directed between opposed portions of said split extremity of said lug, and by having said fastening extending through said opening in said lug and between said opposed portions of said split extension for securing said lug to the second member.

References Cited in the file of this patent
UNITED STATES PATENTS 2,682,325    Mitchell et al.   _____ June 29, 1954
2,932,369    Huguenin   _____ Apr. 12, 1960